United States Patent
Teletia et al.

(10) Patent No.: US 9,305,074 B2
(45) Date of Patent: Apr. 5, 2016

(54) SKEW-AWARE STORAGE AND QUERY EXECUTION ON DISTRIBUTED DATABASE SYSTEMS

(71) Applicant: Microsoft Technology Licensing, LLC, Redmond, WA (US)

(72) Inventors: Nikhil Teletia, Madison, WI (US); Alan Dale Halverson, Verona, WI (US); Srinath Shankar, Madison, WI (US); Jeffrey Naughton, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 13/922,098

(22) Filed: Jun. 19, 2013

(65) Prior Publication Data

US 2014/0379692 A1   Dec. 25, 2014

(51) Int. Cl.
  *G06F 17/30*   (2006.01)
(52) U.S. Cl.
  CPC .... *G06F 17/30584* (2013.01); *G06F 17/30498* (2013.01); *G06F 17/30445* (2013.01); *G06F 17/30466* (2013.01)
(58) Field of Classification Search
  CPC ............... G06F 17/30498; G06F 17/30466; G06F 17/30445
  USPC .......... 707/713, 673, 698, 764, 705, 718, 714
  See application file for complete search history.

(56) References Cited

U.S. PATENT DOCUMENTS

| | | | |
|---|---|---|---|
| 5,121,494 A * | 6/1992 | Dias et al. | |
| 5,873,074 A * | 2/1999 | Kashyap et al. | |
| 5,978,793 A * | 11/1999 | Kashyap et al. | |
| 5,987,468 A * | 11/1999 | Singh et al. | |
| 6,112,198 A * | 8/2000 | Lohman et al. | |
| 7,941,424 B2 * | 5/2011 | Xu | G06F 17/30445 707/714 |
| 8,078,610 B2 * | 12/2011 | Molini | G06F 17/30466 707/714 |
| 8,131,711 B2 * | 3/2012 | Xu | G06F 17/30498 707/714 |
| 8,166,022 B2 | 4/2012 | Han et al. | |
| 8,195,644 B2 * | 6/2012 | Xu | G06F 17/30498 707/714 |
| 8,510,280 B2 * | 8/2013 | Xu et al. | 707/698 |
| 8,799,272 B2 * | 8/2014 | Al-Omari et al. | 707/718 |

(Continued)

OTHER PUBLICATIONS

Gates, et al., "Apache Pig's Optimizer", in IEEE Data Engineering Bulletin, vol. 35, Issue 1, Mar. 2013, 12 pages.

(Continued)

*Primary Examiner* — Frantz Coby
(74) *Attorney, Agent, or Firm* — Aneesh Mehta; Doug Barker; Micky Minhas (57) ABSTRACT

Distributing rows of data in a distributed table distributed across a plurality of nodes. A method includes identifying skewed rows of a first table to be distributed in a distributed database system. The skewed rows include a common data value in a column such that the skewed rows are skewed, according to a predetermined skew factor, with respect to other rows in the first table not having the common data value. Non-skewed rows of the first table that are not skewed according to the skew factor are identified. The skewed rows of the first table are distributed across nodes in a non-deterministic fashion. The non-skewed rows of the first table are distributed across nodes in a deterministic fashion. The rows of the first table distributed across the nodes, whether distributed in a deterministic fashion or non-deterministic fashion, are stored in a single table at each of the nodes.

17 Claims, 4 Drawing Sheets

(56) References Cited

U.S. PATENT DOCUMENTS

| | | | |
|---|---|---|---|
| 8,832,074 B2* | 9/2014 | Zhou | G06F 17/30445 707/713 |
| 8,850,280 B2* | 9/2014 | Tekumalla | G01R 31/318594 714/731 |
| 2005/0131879 A1* | 6/2005 | Ghosh et al. | 707/3 |
| 2005/0131881 A1* | 6/2005 | Ghosh et al. | 707/3 |
| 2005/0132383 A1* | 6/2005 | Ghosh et al. | 719/312 |
| 2009/0248616 A1* | 10/2009 | Molini | 707/2 |
| 2009/0248617 A1* | 10/2009 | Molini | 707/2 |
| 2009/0292668 A1* | 11/2009 | Xu et al. | 707/2 |
| 2009/0299956 A1* | 12/2009 | Xu et al. | 707/2 |
| 2010/0088298 A1* | 4/2010 | Xu | 707/705 |
| 2010/0131540 A1* | 5/2010 | Xu et al. | 707/764 |
| 2010/0146229 A1* | 6/2010 | Yang et al. | 711/157 |
| 2010/0332458 A1* | 12/2010 | Xu et al. | 707/673 |
| 2011/0093499 A1* | 4/2011 | Zhou et al. | 707/770 |
| 2012/0084278 A1 | 4/2012 | Franke et al. | |
| 2012/0117055 A1 | 5/2012 | Al-Omari et al. | |
| 2012/0117056 A1 | 5/2012 | Al-Omari et al. | |
| 2013/0232133 A1* | 9/2013 | Al-Omari et al. | 707/714 |
| 2014/0108459 A1* | 4/2014 | Gaza et al. | 707/792 |

OTHER PUBLICATIONS

Ke, et al., "Optimus: A Dynamic Rewriting Framework for Data-Parallel Execution Plans", in Proceedings of European Conference on Computer Systems, Apr. 15, 2013, 14 pages.

Pavlo, et al., "Skew-Aware Automatic Database Partitioning in Shared-Nothing, Parallel OLTP Systems", in Proceedings of the ACM SIGMOD International Conference on Management of Data, May 20, 2012, 12 pages.

Bamha, Mostafa, "An Optimal Skew-insensitive Join and Multi-join Algorithm for Distributed Architectures", In Proceedings of the 16th International Conference on Database and Expert Systems Applications, Aug. 22, 2005, 10 pages.

Xu, et al., "Efficient Outer Join Data Skew Handling in Parallel DBMS", in Proceedings of the VLDB Endowment, vol. 2, Issue 2, Aug. 24, 2009, 7 pages.

Kwon, et al., "Skew-Resistant Parallel Processing of Feature-Extracting Scientific User-Defined Functions", in Proceedings of the 1st ACM Symposium on Cloud Computing, Jun. 10, 2010, 12 pages.

Xu, et al., "Handling Data Skew in Parallel Joins in Shared-Nothing Systems", ACM SIGMOD, Jun. 9-12, 2008, 10 pages.

\* cited by examiner

Example – "Normal" Hash

102

Customer (106-A)

| Custkey | Name |
|---|---|
| 1 | A |
| 3 | B |

Orders (108-A)

| Orderkey | Custkey |
|---|---|
| 101 | 1 |
| 103 | 4 |
| 105 | 1 |

104

Customer (106-B)

| Custkey | Name |
|---|---|
| 2 | C |
| 4 | D |

Orders (108-B)

| Orderkey | Custkey |
|---|---|
| 102 | 1 |
| 104 | 3 |
| 106 | 1 |

Customer

| Custkey | Name |
|---|---|
| 1 | A |
| 3 | B |

Orders

| Orderkey | Custkey |
|---|---|
| 101 | 1 |
| 105 | 1 |
| 102 | 1 |
| 104 | 3 |
| 106 | 1 |

104

Customer

| Custkey | Name |
|---|---|
| 2 | C |
| 4 | D |

Orders

| Orderkey | Custkey |
|---|---|
| 103 | 4 |

*Figure 1B*

Example – Skew Join Redistribution

Figure 2A

Node 102:
Customer
| Custkey | Name |
|---|---|
| 1 | A |
| 2 | C |

Orders
| Orderkey | Custkey |
|---|---|
| 101 | 1 |
| 103 | 4 |
| 105 | 1 |

Node 104:
Customer
| Custkey | Name |
|---|---|
| 3 | B |
| 4 | D |

Orders
| Orderkey | Custkey |
|---|---|
| 102 | 1 |
| 104 | 3 |
| 106 | 1 |

Figure 2B

Node 102:
Customer
| Custkey | Name |
|---|---|
| 3 | B |
| 1 | A |

Orders
| Orderkey | Custkey |
|---|---|
| 104 | 3 |
| 101 | 1 |
| 105 | 1 |

Node 104:
Customer
| Custkey | Name |
|---|---|
| 2 | C |
| 4 | D |
| 1 | A |

Orders
| Orderkey | Custkey |
|---|---|
| 103 | 4 |
| 102 | 1 |
| 106 | 1 |

Orders 108-C

| Orderkey | Custkey |
|---|---|
| 101 | 1 |
| 105 | 1 |
| 102 | 1 |
| 104 | 3 |
| 106 | 1 |

102

Orders 108-D

| Orderkey | Custkey |
|---|---|
| 103 | 4 |

Orders 108-E

| Orderkey | Custkey |
|---|---|
| 101 | 1 |
| 105 | 1 |
| 104 | 3 |

102

Orders 108-F

| Orderkey | Custkey |
|---|---|
| 103 | 4 |
| 106 | 1 |
| 102 | 1 |

SKEW-AWARE STORAGE AND QUERY EXECUTION ON DISTRIBUTED DATABASE SYSTEMS

BACKGROUND

1. Background

Computers and computing systems have affected nearly every aspect of modern living. Computers are generally involved in work, recreation, healthcare, transportation, entertainment, household management, etc.

2. Relevant Art

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems. In some distributed systems, nodes of a distributed system each perform portions of work to accomplish an overall computing task or set of tasks. Some distributed systems may implement a distributed database where different rows of a distributed table are stored at different nodes. Such distributed databases work best when rows are evenly distributed. In particular, if one node has significantly more rows than other nodes, that node can become a bottleneck when operations, such as joins, on the database are performed.

To ensure even distribution of rows, databases will often hash a particular column using a good hash that distributes evenly and then distribute the rows according to the hash. However, this process does not work for some columns that have a high percentage of one value as compared to other values, i.e. "skewed" columns. Additionally, even though rows may be distributed evenly based on one column, a join with a skewed column may result in a bottleneck scenario. For example, consider an order database that stores information about orders received by an on-line retailer. The order database may have a table that identifies an order number, a customer, and a date. If the table were distributed based on a hash of the order number, the table would distribute very evenly as the order numbers would hash quite evenly because each order number is unique. In fact, the order number itself could probably be used without needing to perform a complex hash on the order number.

However, suppose that after the table was distributed, a join was to be performed based on the customer. Also suppose that one customer has an unusually high number of orders as compared to other customers. The resulting join would result in one portion of the join, the portion with said customer, having an unusually high percentage of the result of the join, which would all be stored on one node. This would cause that node to be required to do significantly more work than the other nodes and would degrade the performance of the entire system. A similar analysis may be performed based on the date column. For example, cyber Monday would have an unusually large number of sales as compared to other days of the year.

Further, if the table were distributed in the first instance based on the customer column or the date column, the table data would be skewed in the first instance.

Thus, it would be helpful to reduce bottlenecks in distributed database systems caused by skewed distributions or joins.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment. The method includes acts for distributing rows of data in a distributed table distributed across a plurality of nodes. The method includes identifying skewed rows of a first table. The first table is to be distributed in a distributed database system. The skewed rows include a common data value in a column such that the skewed rows are skewed, according to a predetermined skew factor, with respect to other rows in the first table not having the common data value. The method further includes identifying non-skewed rows of the first table that are not skewed according to the skew factor. The method further includes distributing the skewed rows of the first table across nodes in a non-deterministic fashion. Non-deterministic distributions are those such as random, pseudo-random, round-robin, etc. where data values in the rows do not determine to which node a row will be distributed. Thus, in different situations, the same row with the same values may be distributed to different nodes. The method further includes distributing the non-skewed rows of the first table across nodes in a deterministic fashion. The rows of the first table distributed across the nodes, whether distributed in a deterministic fashion or non-deterministic fashion, are stored in a single table at each of the nodes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As noted previously, in parallel database systems, data skew is a known problem. Existing partitioning strategies are not capable of distributing the skewed data evenly across the cluster. As a result, a particular node could have much more data than other nodes, which may result in "Hot Nodes" phenomena which results in the execution of the query being slowed down.

To handle data skew at run time, embodiments may implement a new shuffle mechanism referred to herein as "skew-shuffle" that temporarily shuffles the table such that skewed rows are round robin distributed across nodes in a cluster (or some other non-deterministic fashion), non-skewed rows are hash-distributed (or distributed in some other deterministic way) across nodes in a cluster, and rows joining with skewed rows are replicated across nodes in a cluster. A deterministic distribution of rows is one in which the node that a row will be distributed to can be determined based one or more data value in the row or the results of a mathematical operation on one or more data values in the row (such as calculating a hash of some value in the row). For example if there were two nodes, a deterministic distribution may select a value on which to distribute rows and may distribute rows with an odd value to a first node, and rows with an even value to a second node. Thus, knowing whether or not the value is odd or even for a given row, one would be able to identify to which node the given row should be distributed. Non-deterministic distributions are those such as random, pseudo-random, round-robin, etc. where data values in the rows do not determine to which node a row will be distributed. Thus, in different situations, the same row with the same values may be distributed to different nodes.

One aspect of "skew-shuffle" is that all three kinds of rows may be stored in a single table, instead of storing those tables separately and doing a UNION of different tables at the nodes to combine data in different tables.

To avoid needing to perform a skew-shuffle for each query of a recurring query, embodiments may implement an initial data partitioning strategy referred to herein as "skew-aware distribution". Skew aware distribution can distribute skewed data evenly across the cluster and at the same time reduce the data movement performed during join processing. This may be achieved by creating a hybrid partitioning strategy in which a hash based distribution scheme (or other deterministic distribution scheme) distributes non-skewed data and a round robin (or other non-deterministic) distribution scheme distributes skewed data.

Notably, the amount of skew that triggers skew shuffling or skew aware distribution may vary under different circumstances and, in some circumstances, may be selectable by a user. For example, in embodiments where there are different generations of hardware used to create different nodes, where older generations of hardware are less able to handle large workloads, less skew may be tolerable as a skewed join at an older generation node may result in compounded degradation of the distributed system. The amount of tolerable skew may be predefined as a percentage or other statistical deviation. In particular, the deviation may be defined from node to node. Thus, for example, embodiments may tolerate skew up to 5%. In this example, if any node will experience 5% more distribution rows than another row as a result of a deterministic distribution or as a result of some operation, such as a join, skew shuffling or skew aware distribution may be implemented to correct the skew.

Figure 1A:
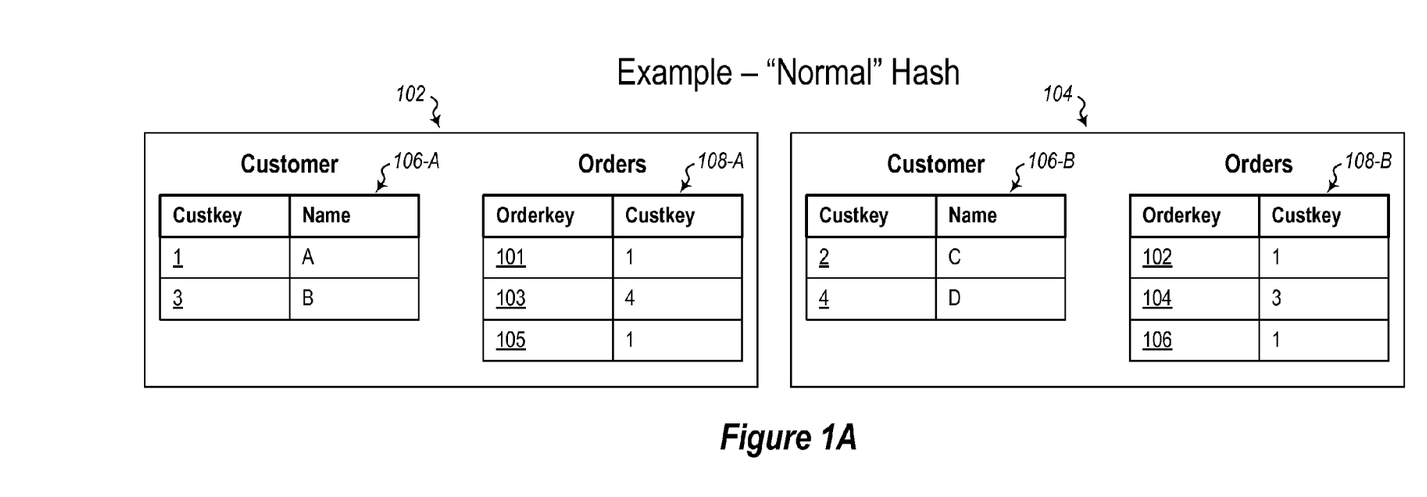
FIG. 1A illustrates a deterministically distributed table.
Figure 1B:
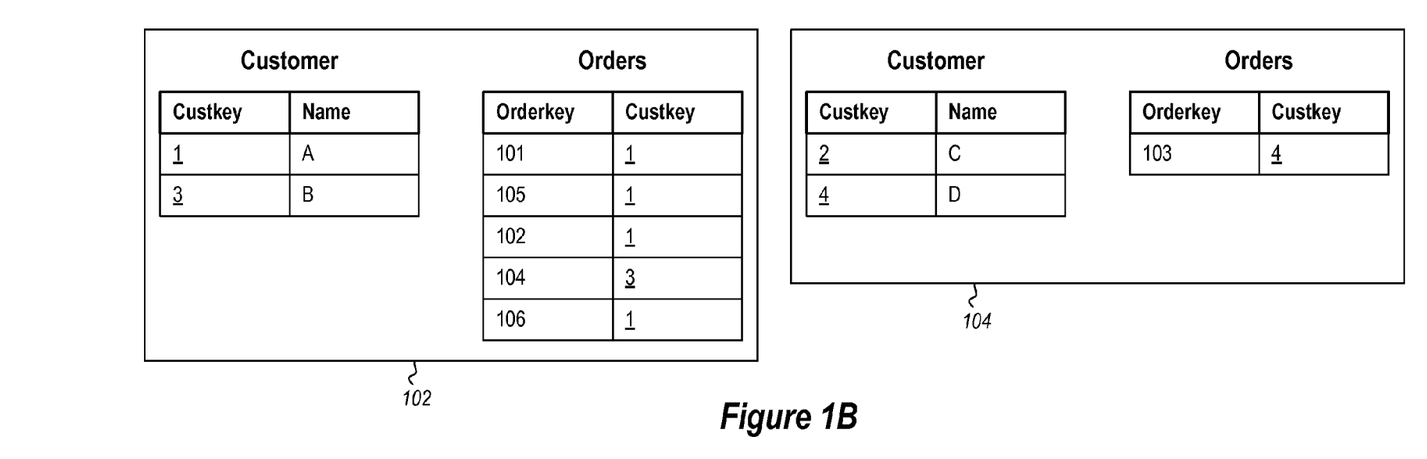
FIG. 1B illustrates skewing of a distributed table based on a join that results in skewed results.

Examples are now illustrated. In particular, FIGS. 1A and 1B illustrate an example of joining "Customers" in a Customer table and "Orders" in an Order table on a customer key Custkey when one customer has many more orders than others. In particular, FIG. 1A illustrates data in tables that is hash distributed where a hash is calculated on a column and based on the hash value a row is stored in a distribution of a compute node. FIG. 1A illustrates a first compute node 102 and a second compute node 104. FIG. 1A illustrates a distributed Customer table and a distributed Orders table. The Customer table is distributed in a deterministic fashion, in this example, based on a hash of a customer number identified as Custkey in the customer table. This results in the Customer table being distributed fairly evenly as illustrated by the tables 106-A and 106-B which make up the Customer table as distributed on the nodes 102 and 104. Similarly, the Orders table is distributed in a deterministic fashion, in this example, based on a hash of an order number identifier "Orderkey" which results in a fairly even distribution of the Orders table as illustrated by the tables 108-A and 108-B which are the distributed portions of the Orders table.

The goal of hash distribution is to horizontally partition data and uniformly distribute the data across nodes. However, a skew scenario may occur where a join could result in uneven numbers of entries caused by the join. For example, joining the tables Customers and Orders on Custkey when one customer (with Custkey=1 in the illustrated example) has many more orders than others results in skew. The join between these two tables will be done by redistributing both tables on Custkey. As a result of redistribution, as illustrated in FIG. 1B, the first node 102 will have orders for Custkey=1 and thus will have more rows than other nodes in the distributed database.

Figure 2A:
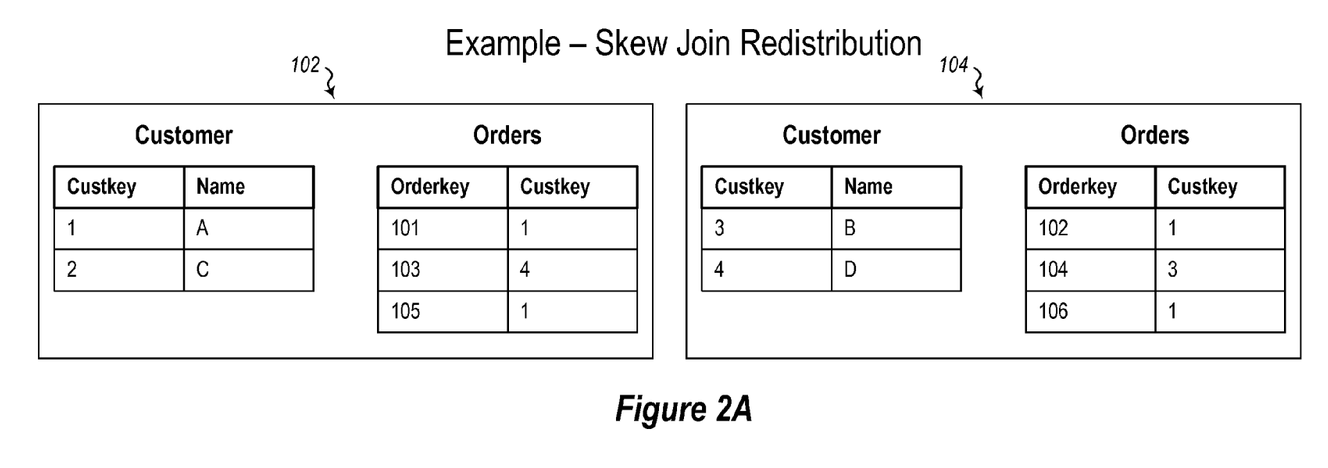
FIG. 2A illustrates a deterministically distributed table.
Figure 2B:
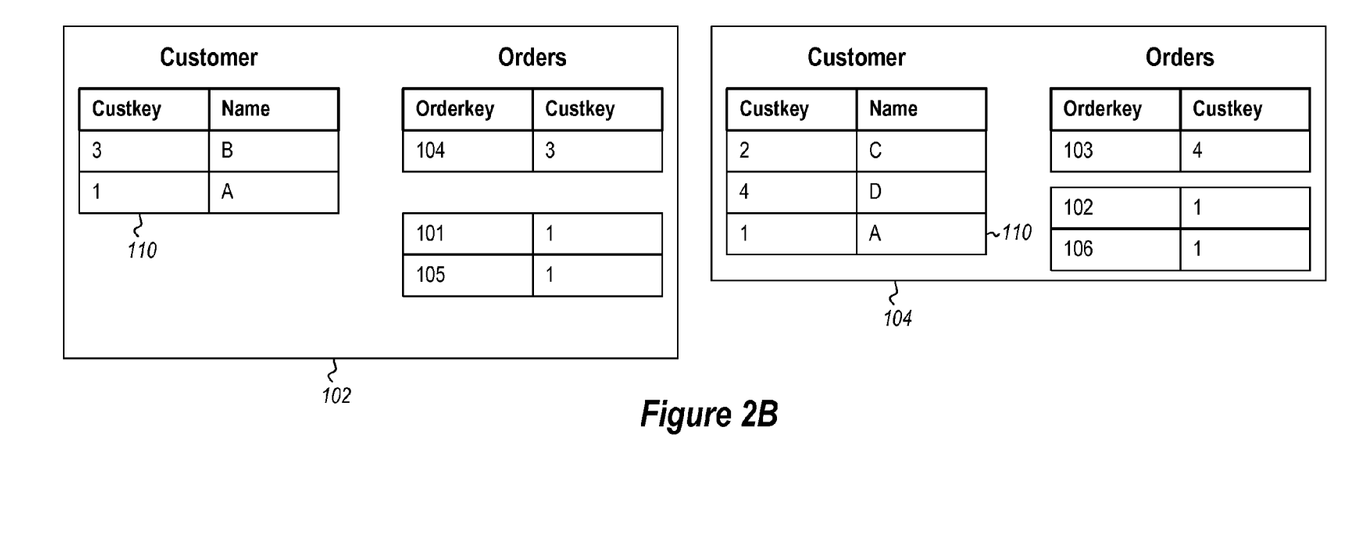
FIG. 2B illustrates the results of a skew shuffle operation to reduce or eliminate skew on join operations.

As illustrated in FIGS. 2A and 2B, this problem may be resolved by a novel approach to redistribution for joins. FIG. 2A illustrates a hash distribution of both the Customer table and the Orders table. However, for join operations, embodiments differentiate between rows: those that will cause significant skew and those that will not, as illustrated in FIG. 2B. In the illustrated example, one could consider the Customer and Order tables as having two kinds of rows: those with Custkey=1, and "the rest".

For "the rest," embodiments perform a normal hash redistribution join as there is no (or limited) skew. For the Orders table, rows with Custkey=1, the rows are distributed by round robin, or some other non-deterministic (even or substantially even) distribution. Thus, rows in a table distributed on a value to perform a join, where the value is skewed as compared to other values in the table are distributed by round robin or some other deterministic distribution.

For Customer table rows with Custkey=1 embodiments replicate those rows across all nodes. For example, row 110 is shown as being replicated across both nodes 102 and 104. Thus, rows in a table used to index a value on which a join is performed, where the value is skewed in a table on which the join will be performed, are replicated to allow the join to take place at the appropriate node. As the replication can be performed to only occur for rows that correlate with skewed values, a limited amount of replication is performed.

Other Customer table rows, where Custkey≠1 can be distributed by a hash distribution or other deterministic distribution. Thus, rows that do not have rows with a skewed value according to some predefined criteria are distributed using a hash distribution or some other deterministic distribution. Thus, the above skew join algorithm can split inputs into various parts to ensure even data redistribution.

Various alternatives can be implemented with regards to distributing skewed rows. For example, two such alternatives are multiple scans and skew shuffling in the first instance.

In some embodiments, multiple scans of tables may be implemented. In particular, multiple scans of a table can be used to identify the non-skewed rows and skewed rows in separate scans. In the case of multiple scans, multiple Shuffle/Non-Deterministic/Replicate operations will be performed. For example—

Table A join Table B on A.col1=B.col2
Table A is skewed on col1 for values {10, 11}

TABLE A

Scan 1:
RoundRobin distribute all values of A where col1 is either 10 or 11.
Scan 2:
Hash Distribute all other values

TABLE B

Scan 1:
Replicate all values of B where col2 is either 10 or 11.
Scan 2:
Hash Distribute all other values In an alternative embodiment, a skew-shuffle may be performed. In particular, embodiments may perform an input split in the database management system and scan the table only once. The following illustrates additional details regarding a skew-shuffle. In a skew shuffle scenario, the entire inputs are read once as the source select statement for a new "skew shuffle" database management system operation. Two lists of values are used to determine row destination. For skewed values in local input, the row is distributed in a non-deterministic fashion; for skewed values in another join input, the row replicates across nodes, otherwise the row shuffles. This is relevant to two table joins when both tables have skewed values for the join column. The following illustrates an example:

Table A join Table B on A.col1=B.col2
Table A is skewed on col1 for values {10, 11}
Table B is skewed on col2 for values {55,66}
Skew-shuffle of Table A—
1. RoundRobin rows where col1 is equal to 10 or 11
2. Replicate rows where col1 is equal to 55 or 66
3. All other rows will be hash distributed.
Skew-shuffle of Table B—
1. RoundRobin rows where col2 is equal to 55 or 66
2. Replicate rows where col2 is equal to 10 or 11
3. All other rows will be hash distributed.

Figure 3A:
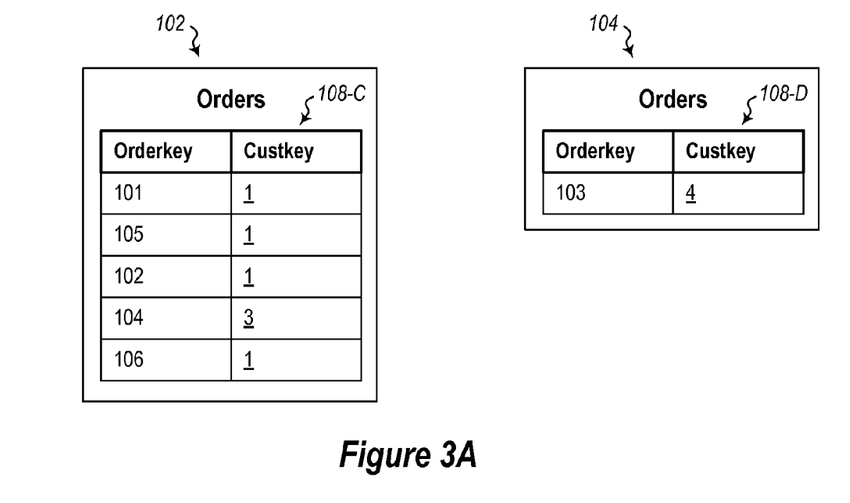
FIG. 3A illustrates a deterministically distributed table.
Figure 3B:
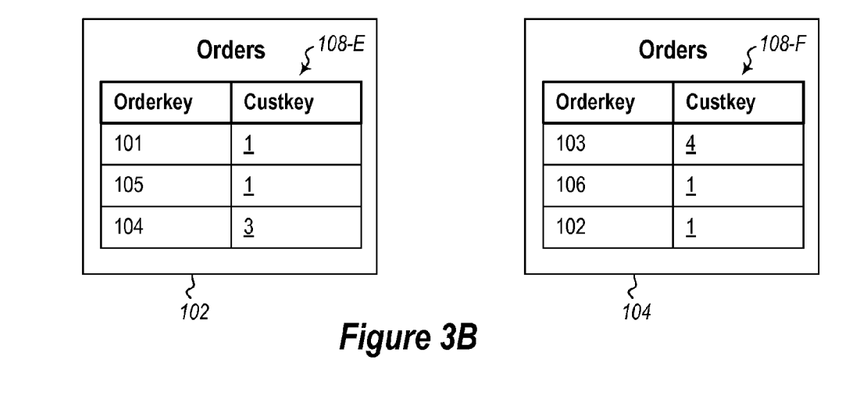
FIG. 3B illustrates a skew aware distribution.

This procedure avoids reading inputs multiple times. Skew-shuffle can be used during both skew-handling join and data load into skew-aware distributed table. Embodiments are able to use a single destination table for all output rows instead of using three different tables. The following math illustrates why this functionality can be achieved:
Given
$A = A_{repl} \cup A_{local}$
$B = B_{local} \cup B_{dist}$
Join attribute $a_i$ and $b_j$
B is skewed on set S={1,2,3}
A is distributed on $a_i$ and B is not distributed on $b_j$
$A_{repl} = (a \in A | a_i \subset S); \quad A_{local} = (a \in A | \sim a_i \subset S); \quad B_{dist} = (b \in B | \sim b_j \subset S); B_{local} = (b \in B | b_j \subset S)$
$A_{repl} \bowtie B_{dist} = \{\}; A_{local} \bowtie B_{local} = \{\}$
$(A_{repl} \cup A_{local}) \bowtie (B_{local} \cup B_{dist}) = (A_{repl} \bowtie B_{local}) \cup (A_{local} \bowtie B_{dist}) \cup (A_{repl} \bowtie B_{dist}) \cup (A_{local} \bowtie B_{local})$
$(A_{repl} \cup A_{local}) \bowtie (B_{local} \cup B_{dist}) = (A_{repl} \bowtie B_{local}) \cup (A_{local} \bowtie B_{dist})$ Some embodiments may encounter a recurring query that joins a skewed table. In such embodiments, a new partitioning can be defined so that a skew handling join performs minimal data movement. This is referred to herein as "skew-aware distribution". Skew-aware distribution includes a distribution that is partially based on a hash distribution (or other deterministic distribution method) and partially based on a round robin distribution (or other non-deterministic distribution method). In the skew aware distribution, rows containing skewed values are non-deterministically distributed (e.g. round robin distributed) and rows containing non-skewed values are deterministically distributed (e.g. hash distributed). During a load phase, if a table has skew and is hash distributed on a "skewed column" then load performance will be sub-standard as all these rows will be sent to a single node. An example is illustrated in FIG. 3A. FIG. 3A illustrates tables 108-C and 108-D that are distributed portions of an Orders table distributed in a deterministic fashion on the Custkey value. This results in node 102 having a disproportionate portion of the Orders table and represents a bottle neck in data processing. However, a "skew-aware distribution" (or even a pure Round Robin or other non-deterministic distribution) can improve the performance drastically by distributing the skewed rows evenly as illustrated in FIG. 3B where the tables 108-D and 108-E on the nodes 102 and 104 respectively are substantially evenly distributed.

Skewed data is round robin (or otherwise non-deterministically) distributed, which results in uniform data placement across cluster. Non-skewed data is hash (or otherwise deterministically) distributed, which results lower data movement cost for queries performing joins on the skewed column.

The following pseudo query illustrates an example for the running example of a new distribution called skew where a table can be created with this distribution using the following:

```
CREATE TABLE orders
( o_orderkey     bigint not null,
  o_custkey      bigint not null)
with (distribution=skew(c_custkey), skewValues=(1))
```

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
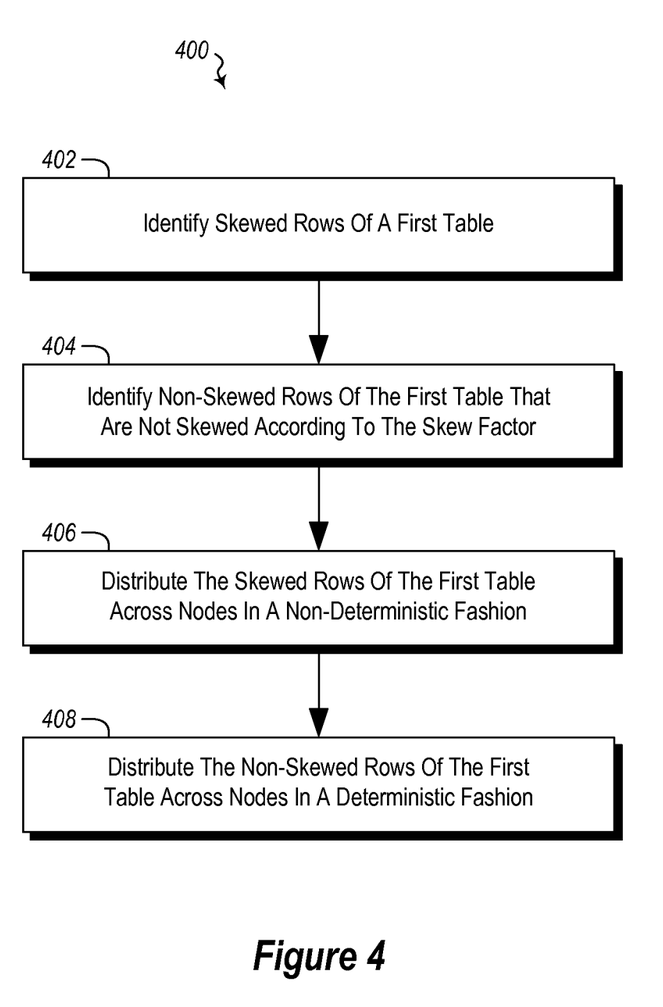
FIG. 4 illustrates a method of distributing rows of data in a distributed table.

Referring now to FIG. 4, a method 400 is illustrated. The method 400 may be practiced in a distributed computing environment. The method 400 includes acts for distributing rows of data in a distributed table distributed across a plurality of nodes. The method 400 includes identifying skewed rows of a first table (act 402). The first table is to be distributed in a distributed database system. The skewed rows includes a common data value in a column such that the skewed rows are skewed, according to a predetermined skew factor, with respect to other rows in the first table not having the common data value. The predetermined skew factor, may be for example, a percentage difference of distribution that might occur if nodes were distributed in a deterministic fashion on the value. The method 400 may be practiced where the skew factor is selected based on a number of nodes across which a table will be distributed. For example, when more nodes are used, less skew may be tolerable as a single node could act as a bottleneck for a larger number of nodes and thus the skew factor may be set at a lower value than might be used when less nodes are in use. Alternatively or additionally, the method 400 may be practiced where the skew factor selected based on generations of hardware used to implement the nodes. For example if older generations of hardware are used for some nodes that are significantly less capable of processing data together with newer hardware that is significantly more capable of processing data, then the skew factor may be set lower as skewed distributions to older hardware nodes would have a compounded degradation effect on performance.

The method 400 further includes identifying non-skewed rows of the first table that are not skewed according to the skew factor (act 404).

The method 400 further includes distributing the skewed rows of the first table across nodes in a non-deterministic fashion (act 406). For example, the method 400 may be practiced where the non-deterministic fashion is round robin. Alternatively, rows may be distributed randomly or pseudo randomly, etc.

The method 400 further includes distributing the non-skewed rows of the first table across nodes in a deterministic fashion (act 408). For example, the method 400 may be practiced where the deterministic fashion is a hash distribution. The method 400 may be practiced where the deterministic fashion assigns ranges of column values to different nodes.

The rows of the first table distributed across the nodes, whether distributed in a deterministic fashion or non-deterministic fashion, are stored in a single table at each of the nodes.

The method 400 may further include distributing by replication any rows in a second table to be joined with rows distributed in a non-deterministic fashion. This allows for joins to what would otherwise be skewed rows.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, etc. which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment including one or more processors and system memory, a method of distributing rows of data in a distributed table distributed across a plurality of nodes, the method comprising:
identifying skewed rows of a first table, the first table to be distributed in a distributed database system, the skewed rows comprising a common data value in a column such that the skewed rows are skewed, according to a skew factor, with respect to other rows in the first table not having the common data value, wherein the skew factor is selected based at least in part on generations of hardware used to implement the plurality of nodes, such that a smaller skew factor is used when the plurality of nodes includes a relatively greater portion of nodes that utilize older generations of hardware, and such that a larger skew factor is used when the plurality of nodes includes a relatively lesser portion of nodes that utilize older generations of hardware;
identifying non-skewed rows of the first table that are not skewed according to the skew factor;
distributing the skewed rows of the first table across nodes in a non-deterministic fashion that is not based on a hash distribution, and such that the skewed rows are enabled to be distributed to any of the plurality of nodes; and
distributing the non-skewed rows of the first table across the nodes in a deterministic fashion, which is based on a hash distributions,
wherein the rows of the first table distributed across the nodes, whether distributed in a deterministic fashion or non-deterministic fashion, are stored in a single table at each of the nodes.

2. The method of claim 1, wherein the non-deterministic fashion is round robin.

3. The method of claim 1, wherein the deterministic fashion is a hash distribution.

4. The method of claim 1 further comprising, distributing by replication any rows in a second table to be joined with the table to rows distributed in a non-deterministic fashion.

5. The method of claim 1, wherein the deterministic fashion assigns ranges of column values to different nodes.

6. The method of claim 1, wherein the skew factor is also selected based at least in part on a number of nodes across which a table will be distributed, and such that a smaller skew factor is used when the number of nodes is large relative to a smaller number of nodes that uses a relatively larger skew factor than the smaller skew factor.

7. A computer system for distributing rows of data in a distributed table distributed across a plurality of nodes in a distributed database environment, comprising:
one or more hardware processors;
one or more network interface cards connecting the computer system to the plurality of nodes; and
one or more computer readable memories having stored thereon computer executable instructions that are executable by at least one of the one or more hardware processors to configure the computer system to perform at least the following:
identify skewed rows of a first table, the first table to be distributed across the plurality of nodes in the distributed database system using the one or more network interface cards, the skewed rows comprising a common data value in a column such that the skewed rows are skewed, according to a skew factor, with respect to other rows in the first table not having the common data value, wherein the skew factor is selected based at least in part on generations of hardware used to implement the plurality of nodes, such that a smaller skew factor is used when the plurality of nodes includes a relatively greater portion of nodes that utilize older generations of hardware, and such that a larger skew factor is used when the plurality of nodes includes a relatively lesser portion of nodes that utilize older generations of hardware;
identify non-skewed rows of the first table that are not skewed according to the skew factor;
based at least on identifying the non-skewed rows of the first table, distribute the skewed rows of the first table across the plurality of nodes in a non-deterministic fashion, and such that the skewed rows are enabled to be distributed to any of the plurality of nodes using the one or more network interface cards; and
based at least on identifying the skewed rows of the first table, distribute the non-skewed rows of the first table across the plurality of nodes in a deterministic fashion,
wherein the rows of the first table distributed across the plurality of nodes, whether distributed in a deterministic fashion or non-deterministic fashion, are stored in a single table at each of the nodes.

8. The computer system of claim 7, wherein the non-deterministic fashion is round robin.

9. The computer system of claim 7, wherein the deterministic fashion is a hash distribution.

10. The computer system of claim 7, wherein the computer executable instructions are also executable to configure the computer system to distribute by replication any rows in a second table to be joined with the table to rows distributed in a non-deterministic fashion.

11. The computer system of claim 7, wherein the deterministic fashion assigns ranges of column values to different nodes.

12. The computer system of claim 7, wherein the skew factor is also selected based at least in part on a number of nodes across which a table will be distributed.

13. A physical computer readable hardware storage medium having stored thereon computer executable instructions that are executable by one or more processors to configure a computer system for distributing rows of data in a distributed table distributed across a plurality of nodes, including computer executable instructions that are executable to configure the computer system perform at least the following:
identify skewed rows of a first table, the first table to be distributed in a distributed database system, the skewed rows comprising a common data value in a column such that the skewed rows are skewed, according to a predetermined skew factor, with respect to other rows in the first table not having the common data value, wherein the skew factor is selected based at least in part on generations of hardware used to implement the plurality of nodes, such that a smaller skew factor is used when the plurality of nodes includes a relatively greater portion of nodes that utilize older generations of hardware, and such that a larger skew factor is used when the plurality of nodes includes a relatively lesser portion of nodes that utilize older generations of hardware;

identify non-skewed rows of the first table that are not skewed according to the skew factor;

identify rows to be joined to the skewed rows based on the common data value;

distribute the skewed rows of the first table across nodes in a non-deterministic fashion, and such that the skewed rows are enabled to be distributed to any of the plurality of nodes;

distribute the non-skewed rows of the first table across the nodes in a deterministic fashion; and distribute rows to be joined to the skewed rows based on the common data value by replication, wherein the rows of the first table distributed across the nodes, whether distributed in a deterministic fashion, non-deterministic fashion or by replication, are stored in a single table at each of the nodes.

14. The physical computer readable hardware storage medium of claim 13, wherein the non-deterministic fashion is round robin.

15. The physical computer readable hardware storage medium of claim 13, wherein the deterministic fashion is a hash distribution.

16. The physical computer readable hardware storage medium of claim 13, wherein the deterministic fashion assigns ranges of column values to different nodes.

17. The physical computer readable hardware storage medium of claim 13, wherein the skew factor is also selected based at least in part on a number of nodes across which a table will be distributed.

* * * * *